United States Patent [19]

Appolonia

[11] Patent Number: 5,520,005
[45] Date of Patent: May 28, 1996

[54] APPARATUS AND METHOD FOR CHILLING SOFT SOLID MATERIALS AND LIQUIDS

[75] Inventor: Jack Appolonia, Yardley, Pa.

[73] Assignee: The BOC Group, Inc., New Providence, N.J.

[21] Appl. No.: 336,777

[22] Filed: Nov. 9, 1994

[51] Int. Cl.⁶ ........................................... F25D 13/06
[52] U.S. Cl. ........................... 62/63; 62/50.1; 62/381; 62/384
[58] Field of Search ............................... 62/384, 388, 35, 62/63, 50.1, 381

[56] References Cited

U.S. PATENT DOCUMENTS

| | | |
|---|---|---|
| 2,480,727 | 8/1949 | Greyson . |
| 2,638,759 | 5/1953 | Barris . |
| 3,089,316 | 5/1963 | Robbins . |
| 3,575,010 | 4/1971 | Honeyman . |
| 4,476,686 | 10/1984 | Madsen et al. . |
| 4,578,957 | 4/1986 | Cunningham . |
| 4,886,534 | 12/1989 | Castan ................................ 62/35 |

FOREIGN PATENT DOCUMENTS

WO92/12460  7/1992  WIPO .

*Primary Examiner*—Ronald C. Capossela
*Attorney, Agent, or Firm*—R. Hain Swope; David A. Draegert; Larry R. Cassett

[57] ABSTRACT

Apparatus and method for chilling foodstuffs in which liquid cryogen is more effectively dispersed to chill the foodstuffs and cryogenic vapor generated by the liquid cryogen is used to remove residual liquid cryogen from the apparatus and for other useful purposes including freezing the foodstuffs.

15 Claims, 2 Drawing Sheets

APPARATUS AND METHOD FOR CHILLING SOFT SOLID MATERIALS AND LIQUIDS

FIELD OF THE INVENTION

The present invention is directed to apparatus and method for reducing the temperature of soft solid and liquid materials while in a blender using high quality liquid cryogen in which at least a portion of the cryogenic vapor obtained from the liquid cryogen is removed and used to freeze materials at another location and/or used to remove residual liquid cryogen contained within the system.

BACKGROUND OF THE PRIOR ART

The present invention generally concerns the chilling of liquid and soft solid materials, such as foodstuffs, sludge, solutions and suspensions using a liquid cryogen such as liquid nitrogen as the cooling medium. In the processing of soft solid and liquid materials such as foodstuffs as, for example, meat, poultry, seafood, vegetable products, bakery products and the like, it is typically necessary to first chill the foodstuffs before commencing further processing (i.e. forming) operations. In order to chill foodstuffs it is common to employ blending devices in which the foodstuffs are mixed with the cooling medium to reduce the average temperature thereof to a desired level.

Cryogenic carbon dioxide and nitrogen have been used as a cooling medium for reducing the temperature of foodstuffs. For example, Scott T. Madsen et al., U.S. Pat. No. 4,476,686 discloses the supply of carbon dioxide gas and snow to a blender at a location below the surface of the foodstuffs. This process is stated to provide improvements over systems that supply carbon dioxide to the top of the blender. In particular, injection of carbon dioxide into the top of the blender results in inefficient blending of the carbon dioxide gas with the foodstuffs and a loss of a portion of the solid carbon dioxide due to sublimation before mixing.

It is also known in the art to inject liquid nitrogen into the top of a blender as described above for the injection of carbon dioxide.

Such methods adequately accomplish the task of chilling of the foodstuffs. However, there are disadvantages associated with such systems. For example, gaseous vapor present in the liquid cryogen feed and/or formed during the cooling process is typically vented to the atmosphere and its cooling capacity is thereby lost. In addition, the blenders typically employed for mixing the cryogen and the foodstuffs do not effectively disperse the liquid cryogen among the foodstuffs. Accordingly, prior art systems tend to result in the uneven chilling of the foodstuffs. Furthermore, prior art systems must be routinely shut down and cleaned to remove the buildup of food particles which adhere to the apparatus because of the presence of residual liquid cryogen.

There is therefore a continuing need to improve the efficiency of systems for the cooling of soft solid and liquid materials, such as foodstuffs within a blending device and a further need to effectively employ the cold vapor resulting from the cooling process rather than merely venting the same to the atmosphere.

SUMMARY OF THE INVENTION

The present invention is generally directed to a process of cooling soft solid and liquid materials, such as foodstuffs with a liquid cryogen and to employ cool vapor generated therefrom for freezing such materials and/or for cleaning the cooling apparatus to remove residual liquid cryogen remaining therein.

As used herein the term "soft solid and liquid materials" which may be chilled in accordance with the present invention includes foodstuffs such as meat, poultry, seafood, vegetable products, bakery products and the like, and further includes solutions, suspensions, sludge and the like. The present invention is especially adapted to the chilling of foodstuffs which will be specifically referred to in the more detailed description of the invention which follows.

In one aspect of the present invention, there is provided an apparatus and method for reducing the temperature of soft solid and liquid materials such as foodstuffs comprising removing cool vapor from a liquid cryogen such as liquid nitrogen, and then injecting the resulting substantially vapor-free liquid cryogen into a vessel containing the foodstuffs below the level of the foodstuffs. The cool vapor removed from the liquid cryogen feed may be sent to a separate vessel (e.g. freezer) to freeze foodstuffs contained therein and the like.

In another aspect of the present invention, the cryogenic vapor obtained from the top of a liquid cryogen storage vessel is passed through the apparatus to remove residual liquid cryogen so as to prevent clogging which arises when food particles adhere to the apparatus.

The present invention also provides for a more effective means of dispersing the liquid cryogen within the blender to obtain more uniform cooling. This is accomplished by employing an injector or nozzle having at least one rectangular slot through which the liquid cryogen enters the blender. In a preferred aspect of the invention, a plurality of spaced-apart rectangular slots are used to inject the liquid cryogen into the blender. During the initial injection phase of the liquid cryogen, means are provided for removing the cryogenic vapor generated during the initial contact of the liquid cryogen with the warm piping system to decrease the cooling cycle and to provide a more consistent flow of the liquid cryogen through the injection nozzles.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

Figure 1:
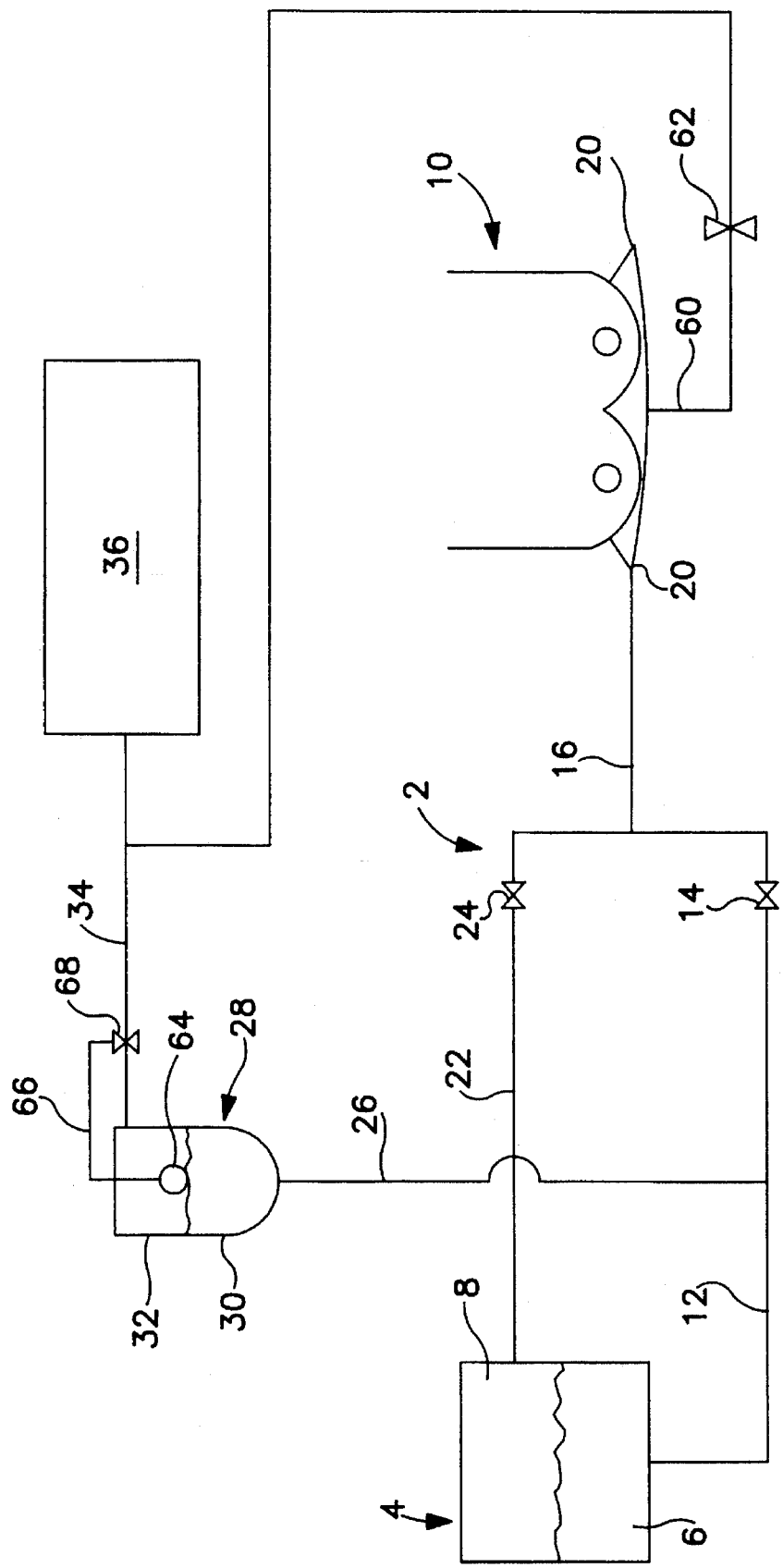
FIG. 1 is a schematic view of one embodiment of the invention in which cryogenic vapor is removed from the liquid cryogen feed and transported to a freezer and cryogenic vapor generated in a storage vessel containing liquid cryogen is used to clear the liquid cryogen supply lines.

Referring to the drawings and particularly to FIG. 1, there is disclosed an embodiment of the invention in which cryogenic vapor is removed from a liquid cryogen feed and circulated to be used as a medium for freezing materials such as foodstuffs. Specifically, the vapor obtained from a feed line is sent to a separate vessel to freeze soft solid or liquid materials such as foodstuffs passing therethrough or used for some other useful purpose. Cryogenic vapor obtained by the vaporization of liquid cryogen contained within a storage vessel is passed through the system. The cryogenic vapor removes residual liquid cryogen contained therein to thereby prevent foodstuffs and the like from adhering to the piping and thereby clogging the system.

As shown in FIG. 1, a cooling system 2 of the present includes a source of liquid cryogen contained within a liquid cryogen storage vessel 4. As used herein the term "liquid cryogen" shall mean any cryogenic substance used in its customary broad sense in liquid form and includes, for example, liquid nitrogen, argon, helium and the like. Liquid nitrogen is the preferred cryogenic substance because of its ready availability and relatively low cost.

The cryogen contained in the storage vessel 4 is comprised of a major liquid portion 6 and a minor vapor portion 8. The liquid portion 6 serves as the principal cooling medium for the system 2. In particular, the liquid portion 6 is transported to a mixing blender 10 via a conduit 12, through a control valve 14 and a conduit 16. As a result of some loss of cooling duty in the conduit 12, some of the liquid cryogen will vaporize therein. The cryogenic vapor contained in the conduit 12 is passed through a conduit 26 into a vessel 28 which operates as a phase separator as described hereinafter.

In accordance with the present invention and as described hereinafter the liquid cryogen from conduit 16 is passed into the mixing blender 10 through an injector or nozzle 20, preferably having at least one, most preferably a plurality of spaced-apart rectangular slots. The slotted arrangement provides a more thorough and efficient mixing of the liquid cryogen and the foodstuffs contained within the mixing blender 10 than customary round injection apertures. As shown in FIG. 1 and as discussed in detail in connection with FIG. 2, more than one nozzle 20 may be provided to the mixing blender 10, with each nozzle 20, preferably having a plurality of rectangular slots for injecting the liquid cryogen.

The blender 10 is provided with a conduit 60 and a bypass valve 62 for allowing cryogenic vapor generated in the conduit 16 to bypass the blender 10 and proceed to a freezer 36 or other such device to be used as a medium for freezing foodstuffs or other material. The cryogenic vapor which passes through the conduit 60 arises from the vaporization of some of the liquid cryogen which passes through the conduit 16.

When the cooling operation is completed, there may be some residual liquid cryogen remaining in the conduits 12, 16 and the valve 14, particularly in the vicinity of the nozzle 20. This residual liquid cryogen can cause food particles or other soft solid materials to stick to the piping and nozzles within the cooling system 2. As a result, the cooling system must be shut down and the associated piping cleaned. To address this problem in accordance with the present invention, the vapor portion 8 within the storage vessel 4 is used to transport or push the residual liquid cryogen out of the conduits 12 and 16 so that it can readily be removed from the cooling system 2. In this regard, the flow of liquid cryogen through the conduit 16 is temporarily terminated by shutting the valve 14 so that liquid cryogen is prevented from passing to the nozzle 20. The vapor portion 8 of the cryogen contained in the vessel 4 is then passed through a conduit 22 via a control valve 24. The vapor passing through the conduit 22 is used to clean the associated piping and valves leading to the blender 10 including the nozzle 20.

The phase separator 28 provides a source of cryogenic vapor 32 for the freezer 36 or other device. The cryogenic vapor 32 is provided by the vaporization of liquid cryogen 30 contained within the separator 28 as well from the cryogenic vapor obtained from the vaporization of the liquid cryogen passing from the vessel 4 through the conduits 12 and 26, respectively.

Contained within the phase separator 28 is a device such as a float 64 for measuring the level of liquid cryogen therein. The float 64 is operatively connected via a line 66 to a control valve 68. As the amount of cryogenic vapor 32 rises in the phase separator 28, the float 64 drops and at a designated level sends a signal to open the control valve 68 allowing cryogenic vapor to flow through the conduit 34 into the freezer 36. As the amount of cryogenic vapor thereby decreases, liquid cryogen flows through the conduits 12 and 26 thereby raising the amount of liquid cryogen in the phase separator 28. Similarly, a signal is sent to close the valve 68 thereby terminating the flow of cryogenic vapor out of the phase separator 28 toward the freezer 36. Eventually, the amount of cryogenic vapor in the phase separator will increase owing to the vaporization of the liquid cryogen within the phase separator 28 and the addition of cryogenic vapor passing through the conduit 26.

The present invention therefore provides an efficient means of utilizing the refrigeration capacity of the liquid cryogen to chill foodstuffs in a mixing blender. The present invention also employs the cooling vapor generated by the liquid cryogen feed during passage through the system for useful purposes including the freezing of foodstuffs. Still further, provision is made for the removal of residual liquid cryogen from the cooling apparatus to prevent clogging.

In another aspect of the present invention, the cooling apparatus is provided with a more efficient means of dispersing the liquid cryogen within the mixing blender to insure more uniform cooling of the foodstuffs. This is accomplished by employing a nozzle or injector having at least one, preferably a plurality of rectangular spaced-apart slots to create separate narrow streams of the liquid cryogen into the mixing blender.

Figure 2:
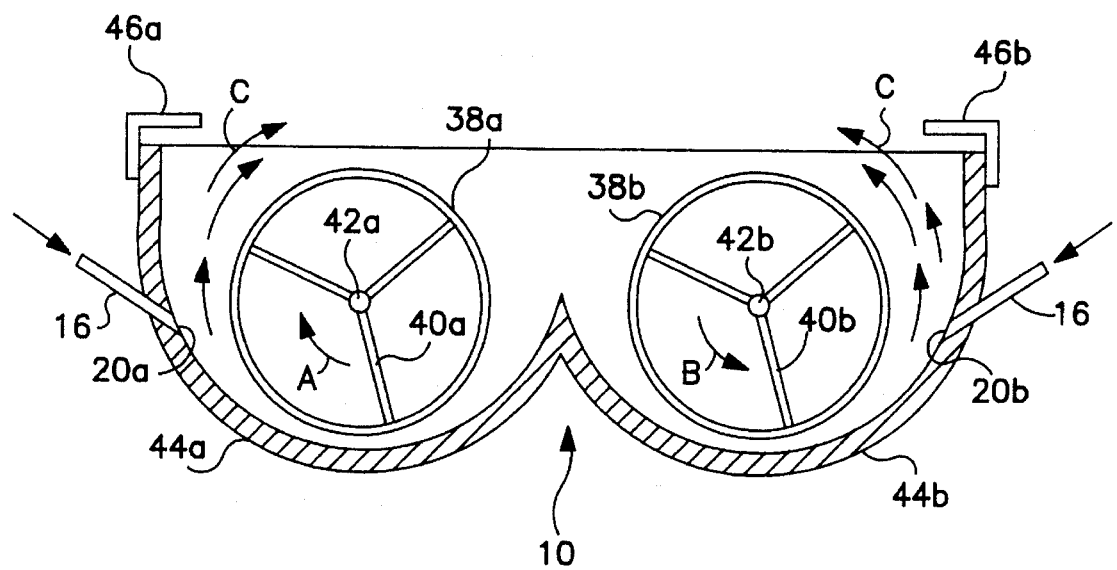
FIG. 2 is a partial side view of a blender employing a slotted nozzle to supply liquid cryogen below the surface of the foodstuffs contained within the blender.
Figure 3:
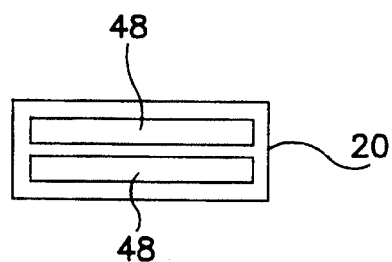
FIG. 3 is a partial front view of the slotted nozzle employed in FIG. 2.

Referring to FIGS. 2 and 3 there is shown a conventional mixing blender 10 having a pair of mixers 38a, 38b including a plurality of supports 40a, 40b rotatable about respective shafts 42a, 42b. As indicated by the arrows "A" and "B" the mixers 38a and 38b rotate in opposite directions. As specifically shown in FIG. 2, the mixer 38a rotates clockwise and the mixer 38b rotates in a counter clockwise direction.

The mixers 38a and 38b are contained with respective troughs 44a and 44b. Each of the troughs has at respective ends thereof deflectors 46a and 46b which channel cryogenic vapor from the mixers 38a and 38b in the direction of arrows "C" to an exhaust (not shown).

A liquid cryogen such as liquid nitrogen enters the mixing blender 10 via a conduit 16 (see FIG. 1) through respective nozzles 20a and 20b. It will be understood that the conduit 16 may be constructed to provide multiple flowpaths to accommodate any number of nozzles employed in the mixing blender as shown in FIG. 2.

As shown specifically in FIG. 3, the nozzles 20a and 20b are provided with at least one rectangular slot 48 (two rectangular slots 48 are shown). The rectangular slots 48 enable the liquid cryogen to be more thoroughly dispersed through the foodstuffs than conventional round nozzles while being chilled within the mixing blender 10. The slots typically a length of from about 2 to 10 cm and a width of from about 0.5 to 2.0 cm.

EXAMPLE

Beef patties at a temperature of 45° F. are to be chilled to a temperature of 29° F. This requires the removal of 37 Btu/lb of beef. For each pound of liquid nitrogen injected into a blender of the type shown in FIG. 2, 110 Btu's of heat can be removed from the beef.

A blender with a capacity of 1,000 lbs would therefore require the injection of about 336 lbs of liquid nitrogen. Since it is desirable to chill the beef in no more than two minutes, 168 lbs of liquid nitrogen would have to be injected per minute into the blender.

A nozzle having rectangular slots of about 5 cm long and 1 cm wide of the type shown in FIG. 3 is used to inject the liquid nitrogen. Each slot can deliver about 30 lbs/minute of liquid nitrogen. Therefore the nozzle would require 6 slots to deliver a sufficient quantity of liquid nitrogen to chill 1,000 lbs of beef in less than about 2 minutes.

What is claimed is:

1. A method of reducing the temperature of a soft solid or liquid material comprising:
   (a) removing any cryogenic vapor from a cryogen containing a cryogen in liquid form;
   (b) injecting the cryogen in liquid form into the bottom of a blender containing the material below the level of the material; and
   (c) mixing the soft solid or liquid material with the cryogen in liquid form.

2. The method of claim 1 comprising injecting the cryogen in liquid form through at least one rectangular slot into the blender.

3. The method of claim 2 comprising injecting the cryogen in liquid form through a plurality of spaced-apart rectangular slots into the blender.

4. The method of claim 1 comprising:
   (a) transporting the cryogen from a first vessel to the blender in a first conduit;
   (b) removing cryogenic vapor in a first location of the first conduit and transporting the cryogenic vapor to a second vessel containing the cryogen in liquid form; and
   (c) transporting cryogenic vapor from said second vessel to a freezer.

5. The method of claim 4 further comprising:
   (a) removing cryogenic vapor from a second location of the first conduit downstream of the first location; and
   (b) transporting the removed cryogenic vapor to the freezer.

6. The method of claim 5 further comprising combining the cryogenic vapor from the second vessel and the cryogenic vapor removed from the second location of the first conduit and transporting the combined cryogenic vapor to the freezer.

7. The method of claim 4 wherein the first vessel contains cryogenic vapor, said method comprising terminating the flow of cryogen in liquid form through the first conduit and passing the cryogenic vapor from the first vessel through the first conduit to remove any residual cryogen in liquid form contained in the first conduit.

8. Apparatus for reducing the temperature of a soft solid or liquid material comprising:
   (a) means for removing any cryogenic vapor from a cryogen containing a cryogen in liquid form;
   (b) a blender for receiving the material;
   (c) injection means for injecting the cryogen in liquid form to the bottom of the blender below the material; and
   (d) mixing means for mixing the material with the cryogen in liquid form.

9. The apparatus of claim 8 wherein the injection means comprises a nozzle having at least one rectangular slot.

10. The apparatus of claim 9 wherein the nozzle has a plurality of spaced-apart rectangular slots.

11. The apparatus of claim 8 comprising a first vessel containing a supply of cryogen in liquid form, first liquid cryogen transporting means for transporting the cryogen in liquid form and any cryogenic vapor from the first vessel to the blender, first means for removing the cryogenic vapor from the first liquid cryogen transporting means and for transporting the cryogenic vapor to a second vessel containing cryogen in liquid form and which may contain cryogenic vapor and second means for removing cryogenic vapor from said first liquid cryogen transporting means.

12. The apparatus of claim 11 wherein the second means for removing cryogenic vapor comprises means for transporting the removed cryogenic vapor to a freezer.

13. The apparatus of claim 11 wherein the second means for removing cryogenic vapor comprises means for combining the cryogenic vapor obtained from the phase separator and transporting said combined cryogenic vapor to the freezer.

14. The apparatus of claim 8 wherein the second vessel is a phase separator, said apparatus further comprising means for transporting cryogenic vapor from the phase separator to a freezer.

15. The apparatus of claim 14 wherein the phase separator further comprises means for monitoring the level of cryogen in liquid form in the phase separator and means controlling the flow of the removed cryogenic vapor to the freezer based on the monitored level of cryogen in liquid form.

* * * * *